March 8, 1966 L. L. CWIK 3,239,474
FOAMED POLYURETHANE HAVING A MARBLEIZED APPEARANCE
AND PROCESS FOR MAKING SAME
Filed Feb. 14, 1962
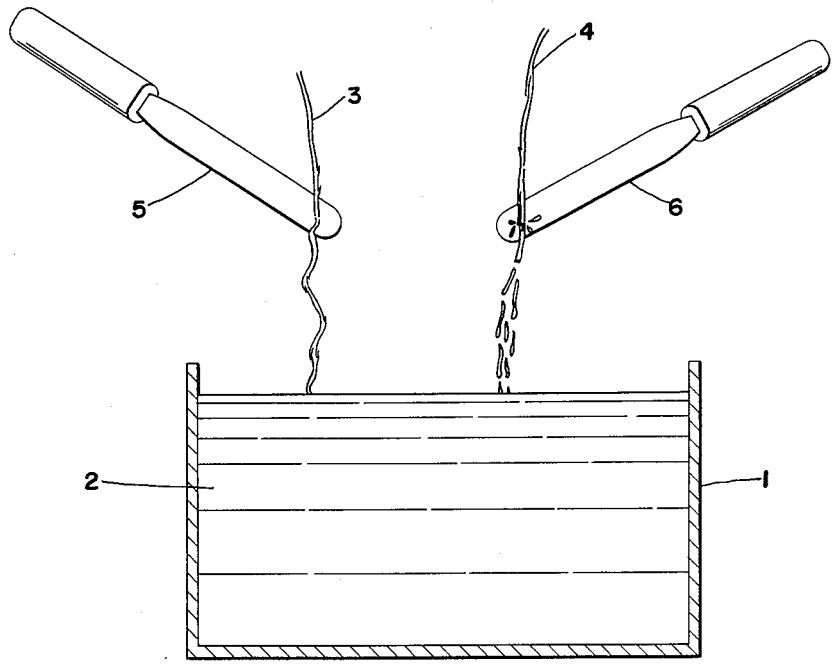

3,239,474
FOAMED POLYURETHANE HAVING A MARBLE-
IZED APPEARANCE AND PROCESS FOR MAK-
ING SAME
Lester L. Cwik, Chicago, Ill., assignor to The Glidden
Company, Cleveland, Ohio, a corporation of Ohio
Filed Feb. 14, 1962, Ser. No. 173,120
9 Claims. (Cl. 260—2.5)

This invention relates to a process for the preparation of marbleized articles and more particularly to manufacturing molded smooth surfaced articles of foamed polyurethane having marbleized appearance.

The present invention provides a process for producing accurately and faithfully molded, light weight, marbleized articles such as botanical, biological, and anatomical models, as well as lamps, wall plaques, statuary and other decorative and serviceable products which have foamed cores and smooth exterior pigmented surfaces. Some wall plaques and other objects produced by this invention can be mounted or hung by pressure sensitive tape because of their small weight.

Broadly, the invention comprises forming a "cream" or "froth" mixture of a polyisocyanate, an active hydrogen-containing organic substance capable of forming a polyurethane structure with said poyisocyanate, and a blowing agent or combination of several blowing agents, and, before terminal foaming has occurred, distributing unevenly in at least a portion of the cream or froth mixture an insoluble contrasting pigment to form a heterogeneous blend, charging a totally enclosing mold with a quantity of the blend sufficient for generating a resultant body of foam that will exert positive pressure on all mold surfaces, permitting terminal foaming and curing of the blend in the mold whereby the resultant positive pressure forms a smooth-skinned article and the foam generation develops pigment striations, and removing from the mold an article of smooth marbleized appearance having a formed interior structure.

The drawing shows in side elevation a pigment addition method that I have employed according to invention principles. It will be described in detail hereinafter in connection with the example.

In preparing the polyurethane cream or froth for use in this invention either the "semi-prepolymer" or the "one-shot" formulation technique is acceptable. In the "semi-prepolymer" process the total polyisocyanate called for in the formulation is premixed with less than all of the active hydrogen-containing compound of the final product, and reaction is allowed to take place between these two components. This resulting "semi-prepolymer" is then vigorously blended with the remaining formulary ingredients plus the rest of the active hydrogen-containing compound to a creamy mixture, or pre-expanded to form a froth or fugitive foam.

In the "one-shot" technique all of the ingredients called for in a formula are simultaneously mixed so that conversion of raw ingredients to a foamable cream or froth is accomplished in a single stage. With either technique a mixture of foamable ingredients is made into a creamy reaction mass or a heterogeneous pre-expanded froth. Also, in either technique, dyes or pigments can be added during the processing of the raw materials. After vigorous mixing, the resulting cream or froth mixture will be colored in a uniform manner in correspondence with these dyes, stains, pigments, or combinations thereof. Thus, these mixtures may be the color of the formulary ingredients, or be colored by a pigment or dye.

Any polyurethane foam type is suitable for the successful accomplishment of this invention, i.e., rigid, semi-rigid, or flexible. Allophanate linkages, i.e., combinations of urethane group reactive hydrogens with isocyanate can advantageously produce polymer crosslinking and resultant foam rigidity. Small amounts of water may be added to combine with the isocyanate group to form an amine. The amine will react with isocyanate to give a urea, which will then react in a polymer cross-linking manner with additional isocyanate to form biuret bridges. These biuret bridges can add further strength to the foam structure.

The final marbleized objects can be protected by the addition of various light-screening agents mixed in the creamy or frothy mass. These agents enhance the continuity of the original appearance of the molded objects even after sustained exposure to light. Such agents include phenyl salicylate, 2-(2-hydroxy 5-methylphenol) benzotriazol, 2,4-dibenzoyl resorcinol, and 2-hydroxy 4-methoxy benzophenone.

The foam and froth forming reactions can be manipulated by conventional catalysts, and the cell size of the foam or froth may be controlled by the addition of suitable surfactants such as a conventional silicone oil or polyglycol-silicone polymer. Examples of reaction catalysts include n-methylmorpholine, tetramethylbutanediamine, triethylenediamine, stannous octoate and dibutyl tin dilaurate.

Foaming of the reactants is conventionally handled by either dissolving a "blowing agent" in the foamable mixture or by adding water to such a mixture or by using combinations of these methods. In water addition, carbon dioxide for foaming will be produced by either the reaction between an isocyanate and water to form an amine or it will be produced when water reacts with the urethane linkage of a "semi-prepolymer" mix. If the water addition method is not employed, suitable conventional halogenated propellants such as trichloromonofluoromethane and trifluoromonochloromethane and mixtures of same may be added to the mixture for foaming. When the reactants are stage-foamed, i.e., made to pass through one or more frothing stages, a first stage halogenated propellant such as dichlorodifluoromethane can be used to form a fugitive froth or pre-expanded mixture. Then, a higher boiling residual frothing agent present in the primary froth can be made to escape and give a second frothing stage, if desired. Terminal foaming to final foam structure is done by retained or extraneously added blowing agent. Otherwise, "blowing" or foaming agents may be used alone in the conventional single stage "creaming" techniques that produce final foams through just one foaming step from a mixture resembling cream rather than froth in consistency.

In the usual preparation of a homogeneous cream or heterogeneous froth the active hydrogen-containing organic compounds include various types such as the glycols, polyols, hydroxyl-rich polyesters as well as the ether glycols. These may be used individually or in combination to produce the creamy or frothy mixture. Examples of polyols include glycerol, pentaerythritol and trimethylolethane, and examples of glycols, include ethylene and diethylene glycol, dipropylene glycol, butylene glycol, and 2-ethyl hexanediol-1,3. Polyethylene glycol adipate is an example of a suitable polyester, but alkyd condensation products of dibasic carboxylic acids such as adipic, azelaic, pimelic, glutaric, sebacic, succinic, or phthalic with glycols or mixtures thereof such as ethylene glycol, triethylene glycol, propylene glycol, or 1,4-butanediol will make a suitable polyester. Examples of suitable polyether glycols include polytrimethylene ether glycol, polytetramethylene ether glycol, polyethylene glycol, polypropylene ether glycol, polyneopentylene ether glycol and polypentamethyl ether glycol. Thiols and related sulfur compounds also can be used.

Any readily reactive polyisocyanate, i.e., having two or more isocyanate groups, may be used to form the frothed or creamy mixture. Examples of suitable difunctional isocyanates include tolylene-2,4-diisocyanate, triphenyl diisocyanate, ethylene diisocyanate, p-phenylene diisocyanate, hexamethylene diisocyanate, 1,4-tetramethylene diisocyanate, meta xylylene diisocyanate, chlorophenyl-2,4-diisocyanate, naphthalene-1,5-diisocyanate, dianisidine diisocyanate, and 3,3'-dimethyl-4,4'-biphenylene diisocyanate.

In some cases where a rigid or semi-rigid foam is desired, cross-linking for that purpose can be accomplished by using a trifunctional isocyanate. Representative triisocyanates compatible in agitated mixtures of foamable creams or froths include 4,4,4'-triisocyanate triphenylmethane and 2,4,6-triisocyanate toluene.

Before the foamable cream or froth is admitted to a mold it is mixed in an uneven and nonuniform manner with the contrasting and insoluble pigments. The background color of the marbleized object is that of the plain or tinted froth or cream mixture. For efficiency and economy and for good functional results the total weight of the contrasting pigments or pigment concentrates should not exceed 10 percent of the weight of the froth or cream mixture.

It is necessary that these insoluble, contrasting pigments be added in a nonuniform, random manner. The expansion of the foam, often resulting in a foamed product 30 to 35 times the volume of the foamable mixture, extends the small, non-uniform pigment concentrations into appropriate and natural-looking striations appearing on the smooth surface formed in the pressure molding. However, heavy localized surface pigment concentrations can give soft tacky spots on finished surfaces. Thus, for the foaming and curing of the final article to produce the most attractive and acceptable article, the total marbleizing pigment is added preferably in low proportions, e.g., 0.1–2% by weight of the foamable mixture fed to the mold. The final product is surprisingly marble-like in appearance and has a rewarding aesthetic appeal.

Advantageously the contrasting pigment or pigments used are concentrated in a dispersible, reactive vehicle (such as a hydroxyl radical-bearing polyester) for easiest distribution and best curing to a uniform, dry surface finish in the molding operation, and their addition is made to the cream or froth to give a streaky, swirling effect. This addition can be accomplished for example by pouring the pigment or the pigment concentrates over spatulas wherefrom it then dribbles into the flowing mass of froth or cream that is being admitted into the mold. Then the terminal foaming and pressure-curing will achieve the attractive effects on the final article. Pressure curing produces the smooth skin on final objects having finished marble appearance without further treatment.

Consistent with the disclosures of this invention the pigment additives can be dry pigments, pigment concentrates, pigments in oil, pigments in synthetic vehicles, organic and inorganic types, or fluorescent and "blacklight" types. Also, conventional fillers may be used in compounding articles by the inventive process. Suitable pigments and fillers for either direct addition into the foamable mixture, or as pigmenting and filling material in a fluid vehicle, are substantially inert towards the foamable mixture and include titanium dioxide, zinc oxide, leaded zinc oxide, white lead, combinations of titanium dioxide and calcium sulfate, lithopone, barium sulfate, diatomaceous silica, fuller's earth, alumina, pigmentary silica, calcium carbonate, clay, talc, Wollastonite, mica, ferric oxide, "brown" iron oxide, tan oxide of iron, burnt sienna, raw and burnt umber, chrome oxide green, phthalocyanine green, the green iron salt of nitroso beta naphthol, ultramarine blue, carbon black, lamp black, toluidine red, parachlor red, cadmium reds and yellows, chrome yellow, chrome orange, Hansa yellow, elemental metal powders and vacuum metallized pigments. Reactive pigments and pigmenting materials can be coated with inert resins, lacquers and other conventional protective coatings and thus be rendered serviceable for producing marbleized materials by being virtually insoluble in the reaction mixture.

Use of reactive vehicles for the contrasting pigment, e.g., hydroxyl-bearing compounds such as alkyd resins or polyols, or the use of isocyanates, thiols, or combinations of all of these, is distinctly preferred for production molding purposes. When these vehicles are used for the contrasting pigment addition there is little danger of producing wet or tacky areas on exterior foam surfaces of mold cured articles. Thus the marbleized objects removed from the mold are consistently ready for additional handling steps without any necessity for further cure time.

For foaming and curing of the product it has been preferred to use the enclosing mold overcharged with reactant mix, i.e., there is more froth or cream poured into the mold than would be necessary to just fill the total mold cavity with foam after final foaming has been completed under atmospheric pressure. The excess charge of mix results in a foam that exerts a positive pressure, that is, about 2–35 p.s.i.g., and advantageously about 20 p.s.i.g., on all mold surfaces which produces a "skin" on the molded article and enhances its final appearance. If desired, a small "bleeder" exit means may be used to control mold pressure. Also the mold cavity can be formed with a hollow core so that the resulting marbleized objects will not be solid. This is especially satisfactory in large molded products because of weight reduction and concomitant cost reduction. Concurrently, the cream or froth can be poured into a mold and around heavier objects, such as weights, rods, wire, hinges, jars, reenforcing webbing, connectors, etc. The finished molded article can thus incorporate masses of varying density at its core or at its exterior that can be used, for example, for balancing or weighting the final product, or as containers, or as fastening devices.

The following example shows how the invention has been practiced, but should not be construed as limiting the invention. All parts herein are parts by weight, and all temperatures are in degrees Fahrenheit, except where otherwise expressly indicated.

Example

A creamy, foamable mixture for generating a structurally rigid polyurethane foam was made by agitating vigorously together 1000 parts of the prepolymer reaction product of a mixture of 80% 2,4-tolylene diisocyanate and 20% 2,6-tolylene diisocyanate with sorbitol polyether, the polyether having hydroxyl number of 190, viscosity at 25° C. (Hoeppler) of 7,500–10,000 centipoises, Acid Number of 0.5, and weight per gallon at 25° C. of 9.1 lbs., the prepolymer having 22.63 weight percent of sorbitol polyether in its composition, and 863 parts of the following mixture: 750 parts of sorbitol polyether as described above, 10 parts of dimethyl polysiloxane oil having viscosity of 900 centistokes at 25° C. and specific gravity at 25° C. of 1.03, 100 parts of liquid trichloromonofluoromethane, and 3 parts of triethylene diamine.

After these components were agitated together in container, 1, to form creamy, homogeneous, white foamable mixture, 2, about 6 parts of brown, 3, and about 6 parts of black, 4, pigment concentrates were added by pouring through spatulas, 5 and 6, and into the mixture one after the other, being careful that these pigment concentrates remained in visible localized concentrations in the mixture.

The brown concentrate was made by grinding 5.31 parts of a pigment mixture (obtained from blending together in pulverulent form 72.37 parts hydrated iron oxide, 24.8 parts aluminum, calcium, and magnesium silicates, 0.05 part manganese dioxide, and 1.3 parts carbon) in 8 pints of a polyester vehicle.

The polyester grinding vehicle was prepared by heating together, to a temperature of 360°, 22.49 parts of propylene glycol, 12.38 parts of maleic anhydride, and 19.38 parts of phthalic anhydride in the presence of 4.37 parts of xylol, to remove water, until an acid number of 50 was reached, then vacuum stripping to 100% solids and cooling to 240°. At this stage 0.25 part of an inhibitor-accelerator compound consisting of a mixture of 79 parts of propylene glycol and 21 parts of acetamidine hydrochloride were added to the esterified mixture, and the esterified mixture was agitated and cooled to 200°. Then 0.01 part of 4-tertiary butyl catechol inhibitor and 50 parts of diallyl phthalate monomer were added, and the final polyester mixture was cooled and filtered to form the pigment vehicle.

Similarly, the black pigment that was added to the creamy, foamable polyurethane mixture was made from 8 pints of the polyester vehicle described above ground with 7.75 parts of a pigment obtained by mixing together in pulverulent form 91.36 parts of black iron oxide, 2.9 parts silica, 1.44 parts alumina, 0.18 part calcium oxide, 0.17 part magnesium oxide, and 0.8 part carbon.

The creamy, foamable polyurethane mixture containing the non-uniform addition of the above contrasting pigment combination was then poured into a delicate madonna statue mold that was covered and weighted. The foam was estimated to generate about 15 p.s.i.g. pressure in the mold. After 15 minutes movement of the foam had stopped, and the piece was removed from the mold. The appearance of the molded object simulated a smoothly-finished marble statue and was considered a finished product except for the removal of flash lines that had formed where the mold was joined.

Subsequently essentially the same technique was used to mold other statues, notably the intricate "Infant of Prague," to give an excellent and striking marble-like reproduction of this famous statue.

I claim:

1. A process for the production of a marbleized molded article which comprises forming an essentially uniform, terminally-foamable mixture capable of subsequent final foaming into a porous structure, said foamable mixture comprising a blowing agent, an organic polyisocyanate, and an active hydrogen organic compound capable of forming a polyurethane structure upon reaction with said polyisocyanate, and before substantial terminal foaming of the mixture occurs, distributing unevenly in at least a portion of the foamable mixture insoluble contrasting pigment in a vehicle therefore and admitting a quantity of the resulting pigmented mixture into an enclosing mold, said quantity being sufficient for generating a resulting body of foam that will exert substantial positive pressure of about 2-35 p.s.i.g. on all mold surfaces, permitting foaming and curing of the pigmented mixture in the mold under the pressure exerted by the resulting body of foam, the foam generation thereby developing random pigment striations and removing from said mold a molded article of smoothly marbleized appearance and having foamed interior structure.

2. The process according to claim 1 wherein said foamable mixture prior to pigment addition and terminal foaming is in the creaming stage.

3. The process according to claim 1 wherein the foamable mixture prior to terminal foaming is in the frothing stage.

4. The process according to claim 1 wherein the blowing agent is at least one halogenated propellant.

5. The process according to claim 1 wherein the resulting body of foam is a rigid polyurethane foam, and the insoluble contrasting pigment is added in a proportion not substantially exceeding 10% by weight of said foamable mixture.

6. The process of claim 1 wherein said foamable mixture is formulated with a background colorant which is dispersed in an even and uniform manner by vigorous agitation prior to the terminal foaming of the mixture and prior to the addition to the mixture of said insoluble contrasting pigment.

7. The process according to claim 1 wherein the enclosing mold contains material disposed for at least partial envelopment by the resulting foam.

8. The process according to claim 1 wherein the contrasting pigment is admitted to the foamable mixture in a vehicle reactable with said foamable mixture.

9. A product produced by the process of claim 1.

References Cited by the Examiner

UNITED STATES PATENTS

| 1,908,747 | 5/1933 | Girg | 264—73 XR |
|---|---|---|---|
| 1,922,548 | 8/1933 | Mattin | 117—37 |
| 2,022,895 | 12/1935 | Monell | 264—77 XR |
| 2,279,344 | 4/1942 | Reid | 264—77 |
| 2,280,488 | 4/1942 | Jenkins et al. | 264—73 |
| 2,625,712 | 1/1953 | Eaby | 18—48.8 |
| 2,811,493 | 10/1957 | Simon et al. | 260—2.5 |
| 2,827,665 | 3/1958 | Rogers et al. | 18—48 |
| 2,914,807 | 12/1959 | Robbins | 18—48.8 |
| 2,986,536 | 5/1961 | Anderson et al. | 260—2.5 |

FOREIGN PATENTS

| 591,353 | 1/1960 | Canada. |
|---|---|---|
| 716,422 | 10/1954 | Great Britain. |
| 823,089 | 11/1959 | Great Britain. |

OTHER REFERENCES

Plastics Engineering Handbook, N.Y., Reinhold Pub. Corp., 1960, 3rd ed., pp. 171–172.

LEON J. BERCOVITZ, *Primary Examiner.*

WILLIAM J. STEPHENSON, *Examiner.*

P. E. ANDERSON, D. E. CZAJA, *Assistant Examiners.*